(12) United States Patent
Imai et al.

(10) Patent No.: US 7,495,360 B2
(45) Date of Patent: Feb. 24, 2009

(54) AUTOMOTIVE DYNAMOELECTRIC MACHINE

(75) Inventors: Daisuke Imai, Tokyo (JP); Masahiko Fujita, Tokyo (JP); Masaru Kuribayashi, Tokyo (JP); Yoshihito Asao, Tokyo (JP); Hideki Morikaku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/436,661

(22) Filed: May 19, 2006

(65) Prior Publication Data

US 2006/0267424 A1    Nov. 30, 2006

(30) Foreign Application Priority Data

May 20, 2005    (JP)    ............................... 2005-148313

(51) Int. Cl.
*H02K 11/00* (2006.01)
(52) U.S. Cl. .......................................... 310/71; 310/71
(58) Field of Classification Search ............... 310/68 D, 310/71
See application file for complete search history.

(56) References Cited

U.S. PATENT DOCUMENTS

| | | | | |
|---|---|---|---|---|
| 5,977,669 | A * | 11/1999 | Yoshida et al. | 310/68 D |
| 6,184,602 | B1 * | 2/2001 | Ooiwa et al. | 310/68 D |
| 6,528,912 | B2 * | 3/2003 | Asao | 310/68 D |
| 6,657,336 | B2 * | 12/2003 | Morikaku et al. | 310/68 D |
| 6,674,193 | B2 * | 1/2004 | Asao | 310/68 D |
| 6,674,194 | B2 * | 1/2004 | Asao | 310/68 D |
| 6,700,243 | B2 * | 3/2004 | Asao | 310/68 D |
| 6,735,071 | B2 * | 5/2004 | Oohashi et al. | 361/306.1 |
| 6,936,941 | B2 * | 8/2005 | Oohashi et al. | 310/68 D |
| 7,021,973 | B2 * | 4/2006 | Morikaku et al. | 439/709 |
| 7,038,339 | B2 * | 5/2006 | Gandrud | 310/85 |
| 2003/0102734 | A1 * | 6/2003 | Asao | 310/68 D |
| 2003/0102735 | A1 * | 6/2003 | Asao | 310/68 D |
| 2004/0092134 | A1 * | 5/2004 | Morikaku et al. | 439/13 |
| 2004/0256927 | A1 * | 12/2004 | Oohashi et al. | 310/68 D |
| 2005/0001494 | A1 * | 1/2005 | Kuribayashi et al. | 310/71 |
| 2006/0273671 | A1 * | 12/2006 | Oohashi et al. | 310/68 D |

FOREIGN PATENT DOCUMENTS

| JP | 05-268753 A | 10/1993 |
|---|---|---|
| JP | 2004153891 A * | 5/2004 |
| JP | 2006325376 A * | 11/2006 |

* cited by examiner

*Primary Examiner*—Dang D Le
*Assistant Examiner*—Naishadh N Desai
(74) *Attorney, Agent, or Firm*—Sughrue Mion, PLLC

(57) ABSTRACT

Stator terminals are fastened between head portions and coupling seats in a state of surface contact by screwing relay members onto external screw thread portions of output terminal bolts. Three-phase wire terminals are fastened in a state of surface contact to end surfaces of the relay members at opposite ends from the coupling seats by screwing nuts onto the external screw thread portions of the output terminal bolts. In addition, insulating tubes are interposed between the relay members and extraction apertures so as to cover outer sides of the relay members.

8 Claims, 6 Drawing Sheets

AUTOMOTIVE DYNAMOELECTRIC MACHINE

BACKGROUND OF THE INVENTION

1. Field of the Invention

The present invention relates to an automotive dynamoelectric machine that is used in a vehicle, and particularly relates to a three-phase output terminal portion for extracting three-phase alternating current output from an automotive dynamoelectric machine.

2. Description of the Related Art

In recent years, dynamoelectric machines are increasingly being used as generator motors by extracting and using three-phase alternating current output from dynamoelectric machines directly, or using alternating-current direct-current (ac/dc) converters.

In conventional automotive alternators, a plurality of terminals for extracting three-phase alternating-current output are molded integrally into a fan guide so as to be embedded in a resin, and a connector portion for external connection is also molded integrally in the resin (see Patent Literature 1, for example).

Patent Literature 1: Japanese Patent Laid-Open No. HEI 05-268753 (Gazette)

In the field of dynamoelectric machines of this kind, technical innovations are leading to increases in electric loads on vehicles, and electric currents flowing through dynamoelectric machines are also increasing. Thus, thick wires are used for three-phase wires connecting the dynamoelectric machines with external equipment so as to be able to cope with large currents.

In conventional automotive alternators, the three-phase alternating-current output is extracted by mounting the external three-phase wires into the connector portion. Here, the three-phase wires and the terminals are connected by the connector, and since the connection is made by spring force, connection resistance at the contacts is increased, and the connecting force is small.

Thus, if large currents flow, the quantity of heat generated at the contacts between the three-phase wires and the terminals is large. The temperature of the terminals thereby increases excessively, and in the worst cases problems may arise such as contact portions welding together, the resin melting, etc. Since the quantity of heat generated is greater in the case of alternating current than with direct current, it is necessary for the connection resistance at the contacts to be reduced if three-phase alternating-current output is to be extracted.

If thick three-phase wires are used, vibration of the vehicle shakes the three-phase wires, and excessive stresses act on connection portions between the three-phase wires and the terminals. Thus, there has been a risk that problems may arise such as the connection portions between the three-phase wires and the terminals being abraded, or damaged, etc.

SUMMARY OF THE INVENTION

The present invention aims to solve the above problems and an object of the present invention is to provide an automotive dynamoelectric machine that can reduce the quantity of heat generated at connection portions between three-phase wires and three-phase output terminal portions and that can also prevent the occurrence of abrasion and damage to the connection portions that result from vehicle vibration by reducing connection resistance at the connection portions and increasing connection strength.

In order to achieve the above object, according to one aspect of the present invention, there is provided an automotive dynamoelectric machine including: a housing; a rotor that is disposed inside the housing so as to be fixed to a rotor shaft that is rotatably supported by the housing; cooling fans that are fixed to two axial end surfaces of the rotor; a stator having: a stator core that is disposed so as to surround the rotor; and a stator winding that is installed in the stator core; and three three-phase output terminal portions for extracting three-phase alternating-current output from the stator to three-phase wires. Each of the three-phase output terminal portions includes: an output terminal bolt having: a head portion; a shaft portion that is disposed so as to extend from the head portion in one direction; and a first external screw thread portion that is formed on the shaft portion; a flat coupling seat that is disposed such that a stator terminal that is electrically connected to an output wire of the stator winding is held between the coupling seat and the head portion; a relay member that is screwed onto the first external screw thread portion, that is projected outward through an extraction aperture that is disposed through the housing, and that fastens the stator terminal between the head portion and the coupling seat; a second external screw thread portion that projects outward from an end surface of the relay member at an opposite end from the coupling seat; and a nut member that is screwed onto the second external screw thread portion such that a three-phase wire terminal that is electrically connected to the three-phase wires is fastened to the end surface of the relay member at the opposite end from the coupling seat. In addition, a protective member that is made of an insulating resin is interposed between the relay member and the extraction aperture so as to cover an outer side of the relay member.

According to the present invention, because the three-phase wire terminals are fastened to the end surfaces of the relay members at the opposite ends from the coupling seats using the nut members that are screwed onto the second external screw thread portions, the three-phase wire terminals and the end surfaces of the relay members at the opposite ends from the coupling seats come into contact in a state of surface contact, reducing connection resistance and increasing connection strength. Thus, the quantity of heat generated in the connection portions can be reduced, enabling Joule loss to be reduced and also enabling the occurrence of abrasion and damage to the connection portions that result from vehicle vibration to be prevented.

Because the stator terminals are fastened between the head portions of the output terminal bolt and the coupling seats using the relay members that are screwed onto the first external screw thread portions of the output terminal bolts, the stator terminals and the coupling seats come into contact in a state of surface contact, reducing connection resistance and also increasing connection strength. Thus, the quantity of heat generated in the connection portions can be reduced, enabling Joule loss to be reduced and also enabling the occurrence of abrasion and damage to the connection portions that result from vehicle vibration to be prevented.

DETAILED DESCRIPTION OF THE PREFERRED EMBODIMENTS

Preferred embodiments of the present invention will now be explained with reference to the drawings.

Embodiment 1

Figure 1:
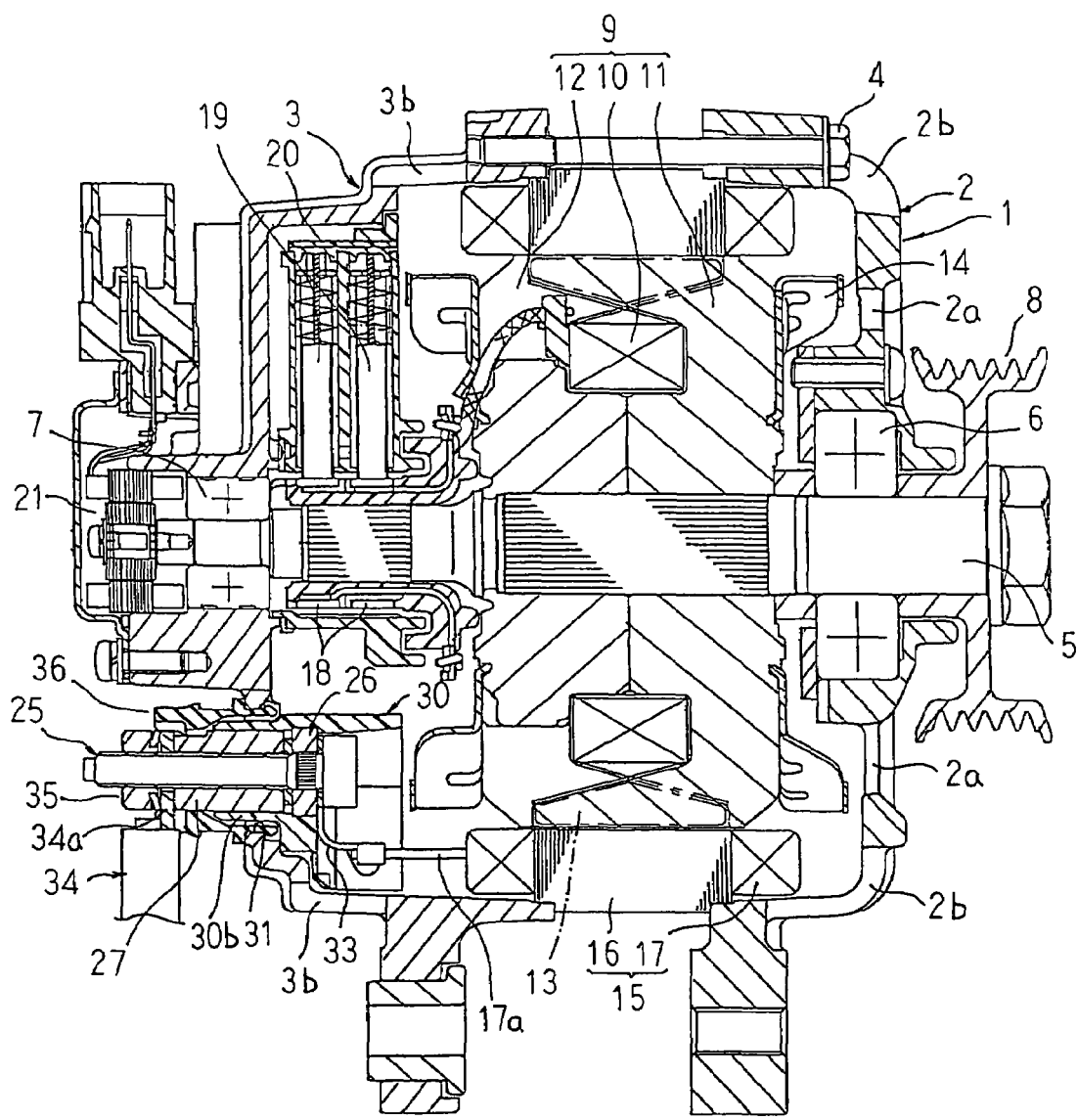
FIG. 1 is a longitudinal section showing an automotive dynamoelectric machine according to Embodiment 1 of the present invention.
Figure 2:
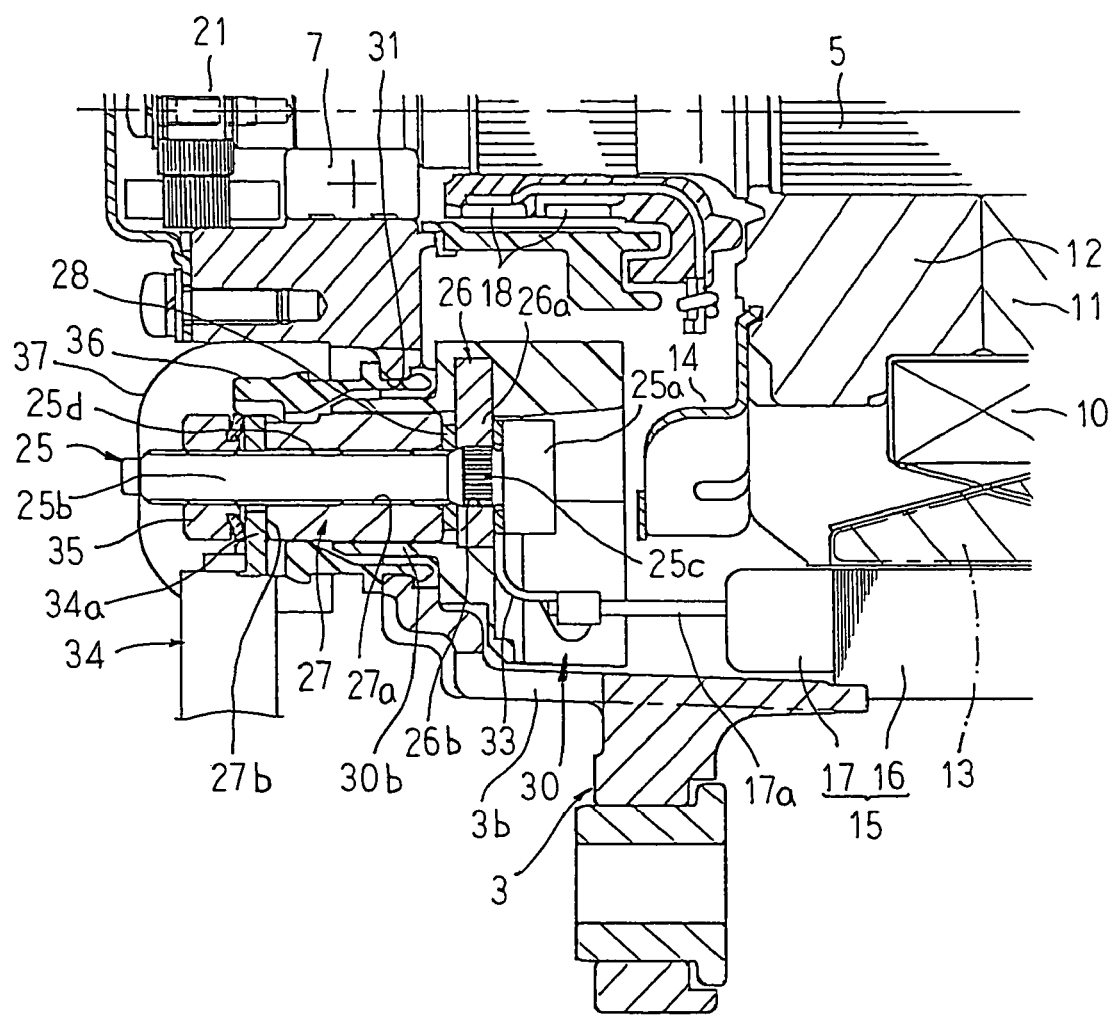
FIG. 2 is a partial enlarged cross section showing a vicinity of a three-phase output terminal portion in the automotive dynamoelectric machine according to Embodiment 1 of the present invention.
Figure 3:
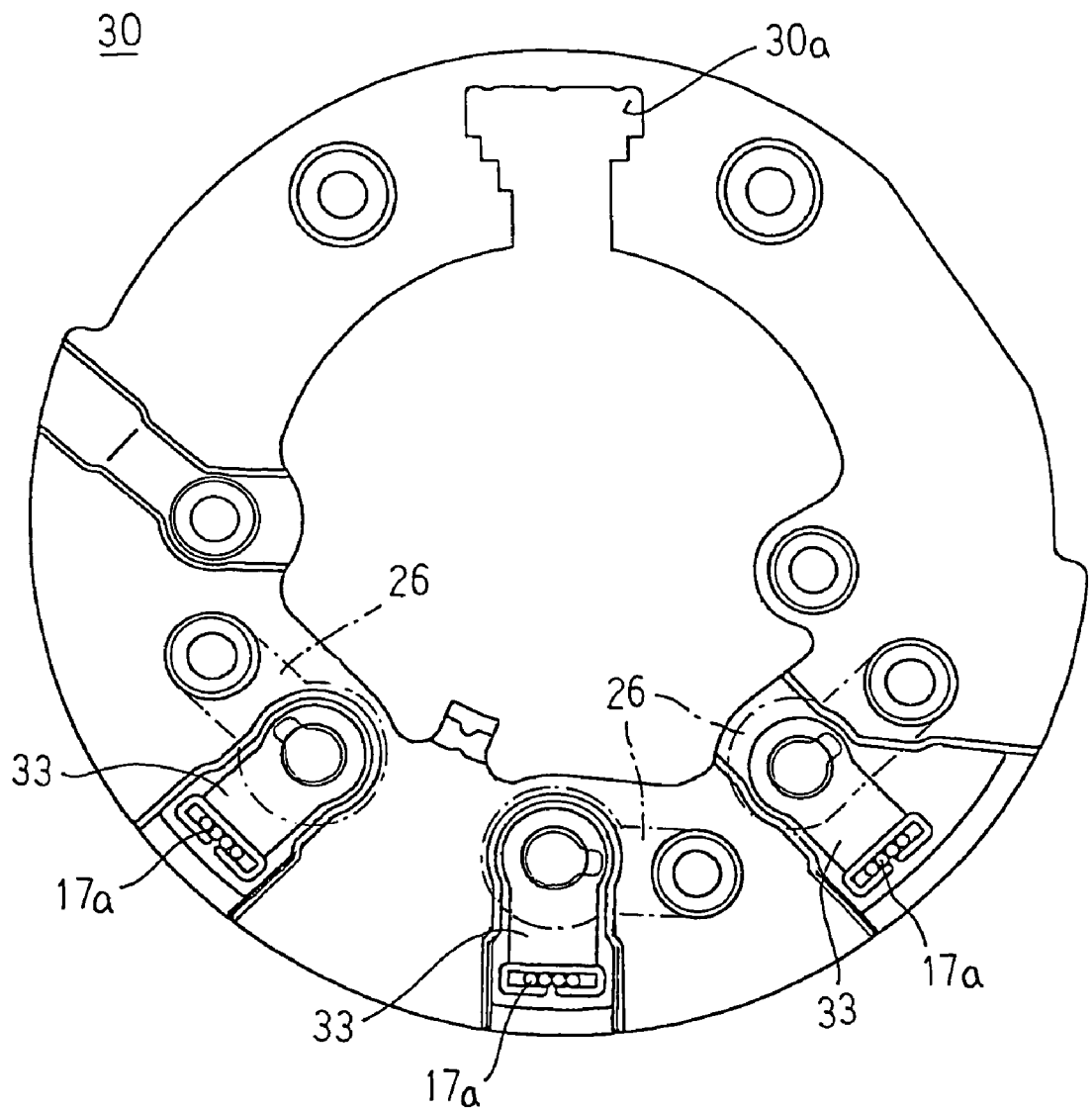
FIG. 3 is a plan showing a molded body used in the automotive dynamoelectric machine according to Embodiment 1 of the present invention.
Figure 4:
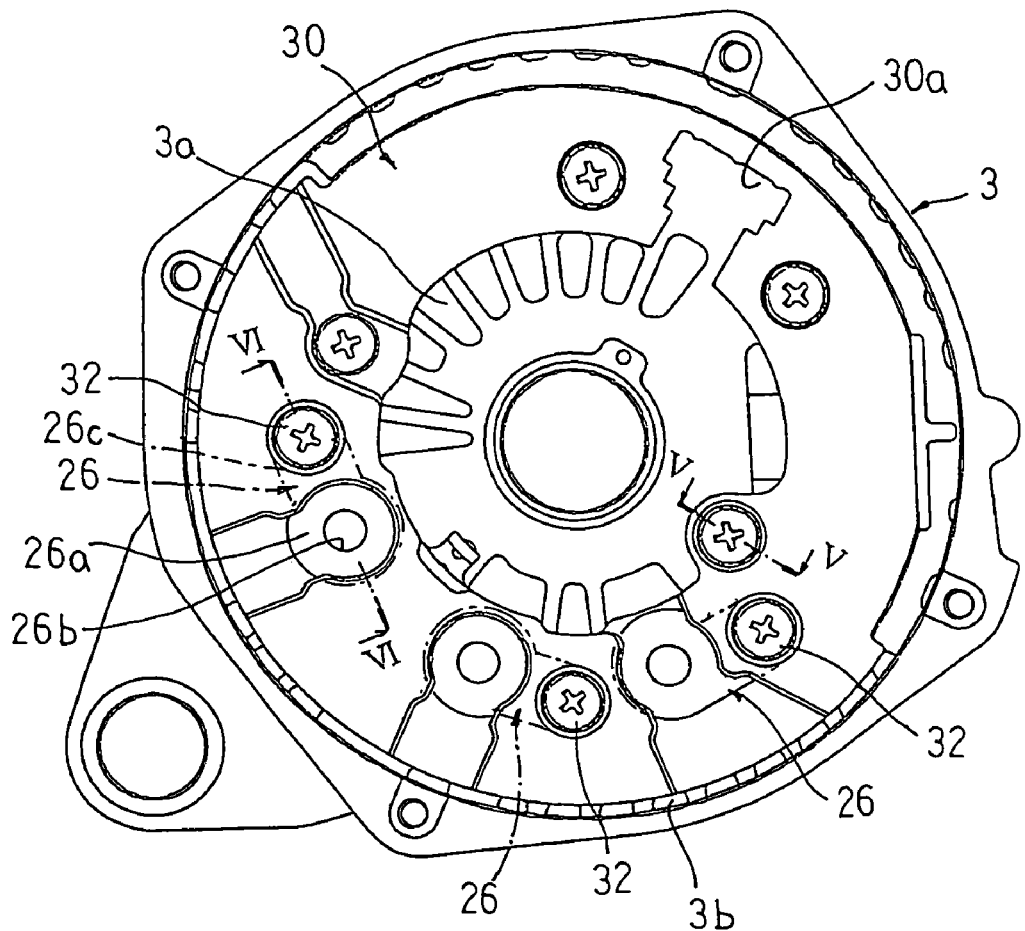
FIG. 4 is a plan showing a rear bracket with the molded body mounted in the automotive dynamoelectric machine according to Embodiment 1 of the present invention.
Figure 5:
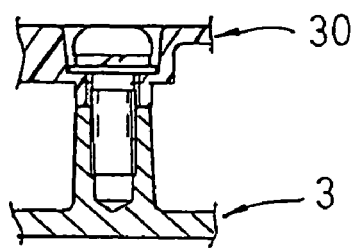
FIG. 5 is a cross section taken along line V-V in FIG. 4 viewed from the direction of the arrows.
Figure 6:
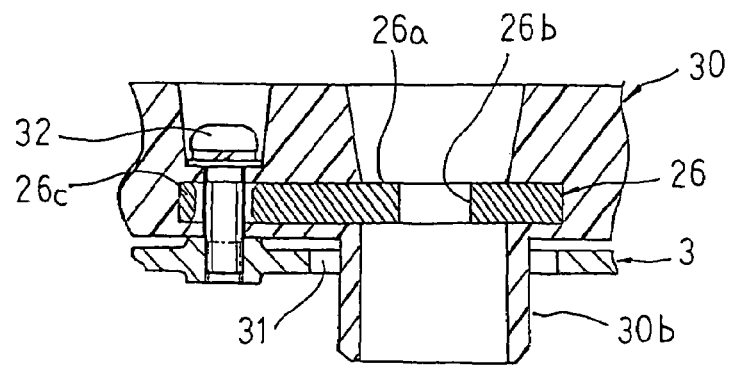
FIG. 6 is a cross section taken along line VI-VI in FIG. 4 viewed from the direction of the arrows.

FIG. 1 is a longitudinal section showing an automotive dynamoelectric machine according to Embodiment 1 of the present invention, FIG. 2 is a partial enlarged cross section showing a vicinity of a three-phase output terminal portion in the automotive dynamoelectric machine according to Embodiment 1 of the present invention, FIG. 3 is a plan showing a molded body used in the automotive dynamoelectric machine according to Embodiment 1 of the present invention, FIG. 4 is a plan showing a rear bracket with the molded body mounted in the automotive dynamoelectric machine according to Embodiment 1 of the present invention, FIG. 5 is a cross section taken along line V-V in FIG. 4 viewed from the direction of the arrows, and FIG. 6 is a cross section taken along line VI-VI in FIG. 4 viewed from the direction of the arrows.

In FIGS. 1 through 6, a housing 1 is configured by disposing a front bracket 2 and a rear bracket 3 that are made of aluminum that is formed into a bowl shape so as to face each other and fastening the two brackets 2 and 3 using bolts 4. A rotor shaft 5 is mounted rotatably to the two brackets 2 and 3 by means of first and second bearings 6 and 7. A pulley 8 is affixed to a portion of the rotor shaft 5 projecting from the front bracket 2, and is linked to a rotating shaft of an engine by means of a belt that is not shown. Front-end and rear-end air intake apertures 2a and 3a are disposed through the end surfaces of the front bracket 2 and the rear bracket 3 radially outside the bearings 6 and 7, and front-end and rear-end air discharge apertures 2b and 3b are disposed through radially outer edge portions of the front bracket 2 and the rear bracket 3.

A Lundell rotor 9 includes: a field winding 10 that generates magnetic flux on passage of electric current; and first and second pole cores 11 and 12 that are disposed so as to cover this the field winding 10 and in which magnetic poles are formed by the magnetic flux. The pole cores 11 and 12 are assembled such that respective claw-shaped magnetic pole portions intermesh and are press-fitted onto the rotor shaft 5, and the rotor 9 is rotatably disposed inside the housing 1. Permanent magnets 13 are also disposed between adjacent claw-shaped magnetic poles. The respective permanent magnets 13 are magnetized so as to have a polarity identical to a polarity of a contacting claw-shaped magnetic pole. Cooling fans 14 are fixed to each of two axial end surfaces of the pole cores 11 and 12 that have been press-fitted onto the rotor shaft 5.

A stator 15 is constituted by: a cylindrical stator core 16; and a stator winding 17 that is installed in the stator core 16. The stator 15 is mounted to the housing 1 so as to surround the rotor 9 such that two outer ends of the stator core 16 are pressed and held between the two brackets 2 and 3 by the fastening force of the bolts 4.

Slip rings 18 are fitted onto the rotor shaft 5 near the second bearing 7, and rotate together with the rotor shaft 5. The slip rings 18 are electrically connected to the field winding 10. A pair of brushes 19 are housed in a brush holder 20, and are disposed such that each slides on a surface of the slip rings 18. A rotor position detecting apparatus 21 that detects relative positioning of the rotor 9 relative to the stator 15 is disposed axially outside the second bearing 7.

Output terminal bolts 25 are made of an electrically-conductive material such as iron, etc., and include: a head portion 25a; a shaft portion 25b that is disposed so as to extend from the head portion 25a in one direction; a knurled portion 25c that is formed on a root portion of the shaft portion 25b; and an external screw thread portion 25d that is formed on the shaft portion 25b. The external screw thread portion 25d corresponds to first and second external screw thread portions.

Coupling seats 26 are made into a flat shape using an electrically-conductive material such as iron, etc., and a penetrating aperture 26b is disposed through a coupling portion 26a thereof. Relay members 27 are made so as to have a cylindrical shape using an electrically-conductive material such as iron, etc., and an internal thread portion 27a is formed on an inner surface thereof.

A fan guide 30 functioning as a molded body is made into a ring-shaped flat plate using a polyphenylene sulfide (PPS) resin, for example. Three coupling seats 26 are insert-molded integrally at predetermined positions on the fan guide 30 such that two surfaces of each of the coupling portions 26a are exposed. A notch 30a is also formed in the fan guide 30 such that the brush holder 20 can be inserted. In addition, insulating tubes 30b functioning as protective members are disposed so as to protrude integrally from the fan guide 30 so as to surround the coupling portions 26a of the coupling seats 26.

The fan guide 30 is disposed so as to be perpendicular to a central axis of the rotor shaft 5 by projecting the insulating tubes 30b outward through extraction apertures 31 that are disposed through the rear bracket 3, and fastening a plurality of mounting screws 32 to inner wall surfaces of the rear bracket 3. The fan guide 30 constitutes a flat fan-facing surface when the brush holder 20 is fitted inside the notch 30a. Moreover, the fan-facing surface is an annular surface that faces blades of a cooling fan 14. Three mounting screws 32 are passed in an electrically-insulated state through projecting portions 26c of the coupling seats 26 that are embedded in the fan guide 30, and are fastened to the inner wall surfaces of the rear bracket 3.

The output terminal bolts 25 are mounted to the coupling seats 26 by pressing the knurled portion 25c into the penetrating aperture 26b of the respective coupling seat 26. Washers 28 are mounted to the shaft portions 25b of the output terminal bolts 25, and the relay members 27 are fastened to the external screw thread portions 25d that are formed on the shaft portions 25b. Thus, first ends of stator terminals 33 are held under pressure between the head portions 25a and the coupling portions 26a of the coupling seats 26 in a state of surface contact by the fastening forces of the relay members 27 that are screwed onto the external screw thread portions 25d of the output terminal bolts 25. The output wires 17a of the stator winding 17 are welded to second ends of the stator terminals 33.

Three-phase wire terminals 34a of the three-phase wires 34 are mounted to the external screw thread portions 25d of each of the output terminal bolts 25, and are fastened in a state of surface contact to end surfaces 27b of the relay members 27 that are at opposite ends from the coupling seats by fastening nuts 35 functioning as nut members onto the external screw thread portions 25d. Insulating bushes 36 that are made of a PPS resin, for example, are mounted so as to cover the insulating tubes 30b, portions of the output terminal bolts 25 projecting from the insulating tubes 30b, and also the three-phase wire terminals 34a by inserting first ends inside the extraction apertures 31. In addition, covers 37 are mounted over the insulating bushes 36 so as to cover coupled portions of the nuts 35.

Here, the output terminal bolts 25, the coupling seats 26, the relay members 27, the washers 28, and the nuts 35 constitute three-phase output terminal portions. Moreover, the washers 28 may also be omitted and the relay members 27 placed directly in contact with the coupling seats 26.

In an automotive dynamoelectric machine constructed in this manner, electric current is supplied to the field winding 10 from a battery (not shown) by means of the brushes 19 and the slip rings 18, generating a magnetic flux. The claw-shaped magnetic poles in the first pole core 11 are magnetized into North-seeking (N) poles by this magnetic flux, and claw-shaped magnetic poles in the second pole core 12 are magnetized into South-seeking (S) poles. At the same time, rotational torque from an output shaft of the engine is transmitted to the rotor shaft 5 by means of a belt (not shown) and the pulley 8, rotating the rotor 9. Thus, a rotating magnetic field is imparted to the stator winding 17, generating an electromotive force in the stator winding 17. This alternating-current electromotive force passes through the output wires 17a, the stator terminals 33, the coupling seats 26, the washers 28, and the relay members 27 and is extracted externally through the three-phase wires 34. The three-phase alternating current that is extracted through the three-phase wires 34 is input into an external three-phase rectifying circuit (not shown) so as to be rectified into direct current, charges the battery, and is supplied to electric loads, etc.

During starting of the engine, alternating current is supplied sequentially through the three-phase wires 34 to each of the phases of the stator winding 17 by a three-phase drive circuit (not shown), and field current is supplied to the field winding 10 through the brushes 19 and the slip rings 18. Thus, the stator winding 17 and the field winding 10 become electromagnets, and the rotor 9 rotates inside the stator 15 together with the rotor shaft 5. Torque from the rotor shaft 5 is transmitted from the pulley 8 to the output shaft of the engine by means of the belt, starting the engine. At this time, the rotor position detecting apparatus 21 detects the rotation angle of the rotor 9. Then, a control apparatus (not shown) controls the alternating current supplied sequentially to each of the phases of the three-phase stator winding 17 such that the direction of rotation of the rotor 9 is constant and a predetermined rotational frequency is achieved.

In addition, in this automotive dynamoelectric machine, when the rotor shaft 5 is rotated, the cooling fans 14 are driven to rotate together with the rotor 9. External air is sucked inside the housing 1 through the air intake apertures 2a and 3a due to rotation of the cooling fans 14.

External air that has been sucked in through the front-end air intake apertures 2a is deflected centrifugally by the cooling fans 14, and is discharged outside the housing 1 through the front-end air discharge apertures 2b. Thus, heat from front-end coil ends of the stator winding 17 that constitute heat-generating parts inside the housing 1 is absorbed into the cooling airflow, cooling the stator 15.

At the same time, external air that has been sucked in through the rear-end air intake apertures 3a flows radially inward along the brush holder 20 and the fan guide 30, passes between an inner side of the fan guide 30 and the rotor shaft 5, and flows toward the rotor 9. The air that has flowed toward the rotor 9 is deflected centrifugally by the cooling fans 14, and is discharged outside the housing 1 through the rear-end air discharge apertures 3b. Thus, heat from rear-end coil ends of the stator winding 17 is absorbed into the cooling airflow, cooling the stator 15. The electrical connection portions between the output terminal bolts 25 and the stator terminals 33 are also cooled.

According to Embodiment 1, the external screw thread portions 25d of the output terminal bolts 25 are projected through the extraction apertures 31, and the three-phase wire terminals 34a are fixed by fastening in a state of surface contact to end surfaces 27b that are at opposite ends from the coupling seats of the relay members 27 that are screwed onto the external screw thread portions 25d using the fastening force of the nuts 35. The connecting force of the three-phase wire terminals 34a relative to the output terminal bolts 25 is thereby increased, reducing connection resistance between the relay members 27 and the three-phase wire terminals 34a.

Thus, even if large currents flow, generation of heat at the contacts between the relay members 27 and the three-phase wire terminals 34a is suppressed, suppressing temperature increases in the respective connection portions. The occurrence of welding of the contact portions, and fusion of surrounding resin parts, etc., is thereby prevented. Joule loss due to the electric current also decreases, improving characteristics and efficiency.

In addition, because the three-phase wire terminals 34a are connected to the relay members 27 firmly, the connection portions between the relay members 27 and the three-phase wire terminals 34a are prevented from being abraded or damaged, etc., even if vehicle vibration shakes the three-phase wires 34.

The stator terminals 33 are fixed in a state of surface contact by fastening between the head portions 25a of the output terminal bolts 25 and the coupling seats 26 by the fastening force of the relay members 27. In addition, the washers 28 are fixed in a state of surface contact by fastening between the coupling seats 26 and the relay members 27 by the fastening force of the relay members 27. Screwed-together portions are thereby removed from the main electrical conduction pathway extending from the stator terminals 33 to the three-phase wire terminals 34a. In other words, electrical connection portions in this main electrical conduction pathway are constituted by surface contacting portions. Thus, even if large currents flow, the generation of heat in this main electrical conduction pathway is suppressed, reliably preventing the occurrence of welding of the contact portions, fusion of resin parts, etc.

Because the output terminal bolts 25 and the stator terminals 33 are connected firmly by the fastening force of the relay members 27 that are screwed onto the external screw thread portions 25d, the connection portions between the output terminal bolts 25 and the stator terminals 33 are prevented from being abraded or damaged, etc., even if vehicle vibration propagates through the three-phase wires 34 to the output terminal bolts 25.

Because the relay members 27 projects outside the rear bracket 3 through the extraction apertures 31, fastening of the stator terminals 33 and the coupling seats 26 can be performed from outside the housing 1. Thus, the operation of fastening the stator terminals 33 and the coupling seats 26 can be performed after the stator 15 and the rotor 9 have been mounted to the housing 1, improving assembly.

The mounting screws 32 are passed through the projecting portions 26c of the coupling seats 26 that are embedded in the fan guide 30 in an electrically-insulated state, and are fastened to the inner wall surfaces of the rear bracket 3. Thus, the coupling seats 26 are fixed firmly to the rear bracket 3 while ensuring an insulated state. The output terminal bolts 25 are thereby prevented from pivoting, etc., even if vehicle vibration propagates through the three-phase wires 34 to the output terminal bolts 25. Thus, the connection portions between the output terminal bolts 25 and the stator terminals 33 are prevented from being damaged, etc.

Because the fan guide 30 is disposed so as to constitute a flat fan-facing surface, wind noise due to interference between the cooling fans 14 and the fan guide 30 is reduced. In addition, the cooling airflow that has been deflected centrifugally by the cooling fans 14 absorbs heat from the head portions 25a of the output terminal bolts 25. Thus, heat generated by the three-phase output terminal portions is absorbed by the cooling airflows via the output terminal bolts 25, suppressing excessive temperature increases.

Because the insulating tubes 30b are interposed between the relay members 27 and the extraction apertures 31 so as to cover outer sides of the relay members 27, electrical insulation characteristics between the relay members 27 and the housing 1 are ensured.

Because the insulating tubes 30b are molded integrally into the fan guide 30, the number of parts is reduced, improving assembly.

Because the three coupling seats 26 are molded integrally into the fan guide 30, the number of parts is reduced, improving assembly.

In addition, because the stator terminals 33 and the three-phase wire terminals 34a are fastened using single output terminal bolts 25, the construction of the three-phase output terminal portions is simplified and made robust.

Embodiment 2

Figure 7:
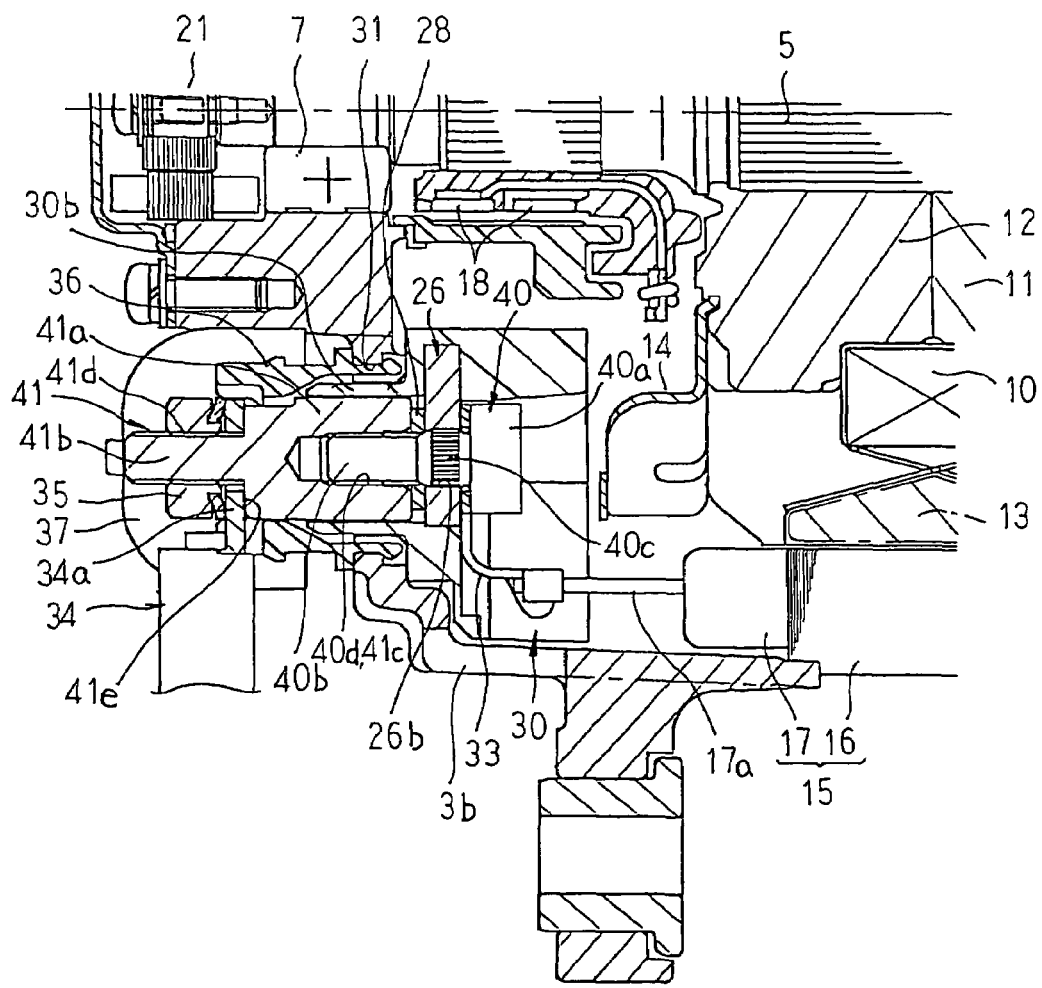
FIG. 7 is a partial enlarged cross section showing a vicinity of a three-phase output terminal portion in an automotive dynamoelectric machine according to Embodiment 2 of the present invention.

FIG. 7 is a partial enlarged cross section showing a vicinity of a three-phase output terminal portion in an automotive dynamoelectric machine according to Embodiment 2 of the present invention.

In FIG. 7, an output terminal bolt 40 is made of an electrically-conductive material such as iron, etc., and includes: a head portion 40a; a shaft portion 40b that is disposed so as to extend from the head portion 40a in one direction; a knurled portion 40c that is formed on a root portion of the shaft portion 40b; and a first external screw thread portion 40d that is formed on the shaft portion 40b.

A relay member 41 is made of an electrically-conductive material such as iron, etc., and is made so as to have a stepped cylindrical shape constituted by: a large-diameter cylinder portion 41a; and a small-diameter shaft portion 41b that is disposed so as to protrude coaxially from a first end surface of the cylinder portion 41a. An internal thread portion 41c is formed to a predetermined depth from a second end at a position of a central axis of the cylinder portion 41a. In addition, a second external screw thread portion 41d is formed on the shaft portion 41b. The first end surface of the cylinder portion 41a constitutes an end surface 41e that is at an opposite end from a coupling seat.

Moreover, the rest of this embodiment is configured in a similar manner to Embodiment 1 above.

In Embodiment 2, the output terminal bolts 40 are mounted to the coupling seats 26 by pressing the knurled portion 40c into the penetrating aperture 26b of the respective coupling seat 26. Washers 28 are mounted to the shaft portions 40b of the output terminal bolts 40, and the internal thread portions 41c of the relay members 41 are screwed onto the first external screw thread portions 40d that are formed on the shaft portions 40b. Thus, first ends of stator terminals 33 are held under pressure between the head portions 40a and the coupling portions 26a of the coupling seats 26 in a state of surface contact by the fastening forces of the relay members 41 that are screwed onto the first external screw thread portions 40d of the output terminal bolts 40. The output wires 17a of the stator winding 17 are welded to second ends of the stator terminals 33.

The three-phase wire terminals 34a of the three-phase wires 34 are mounted to the second external screw thread portions 41d that are formed on the shaft portions 41b of each of the relay members 41, and are fastened in a state of surface contact to the end surfaces 41e of the relay members 41 that are at opposite ends from the coupling seats by fastening nuts 35 onto the second external screw thread portions 41d.

Here, the output terminal bolts 40, the coupling seats 26, the relay members 41, the washers 28, and the nuts 35 constitute three-phase output terminal portions. Moreover, the washers 28 may also be omitted and the relay members 41 placed directly in contact with the coupling seats 26.

Consequently, similar effects to those in Embodiment 1 above can also be achieved in Embodiment 2.

Furthermore, the first external screw thread portion 40d of the output terminal bolts 40 has a length that is shorter in construction than the external screw thread portion 25d of the output terminal bolts 25 according to Embodiment 1 above. Thus, the process of fastening the relay members 41 onto the output terminal bolts 40 is shorter, improving assembly.

Because the three-phase wire terminals 34a are mounted by fastening the nuts 35 onto the second external screw thread portions 41d formed integrally on the relay members 41, rigidity of the coupled portions of the three-phase wire terminals 34a is high, improving vibration resistance after assembly.

Embodiment 3

Figure 8:
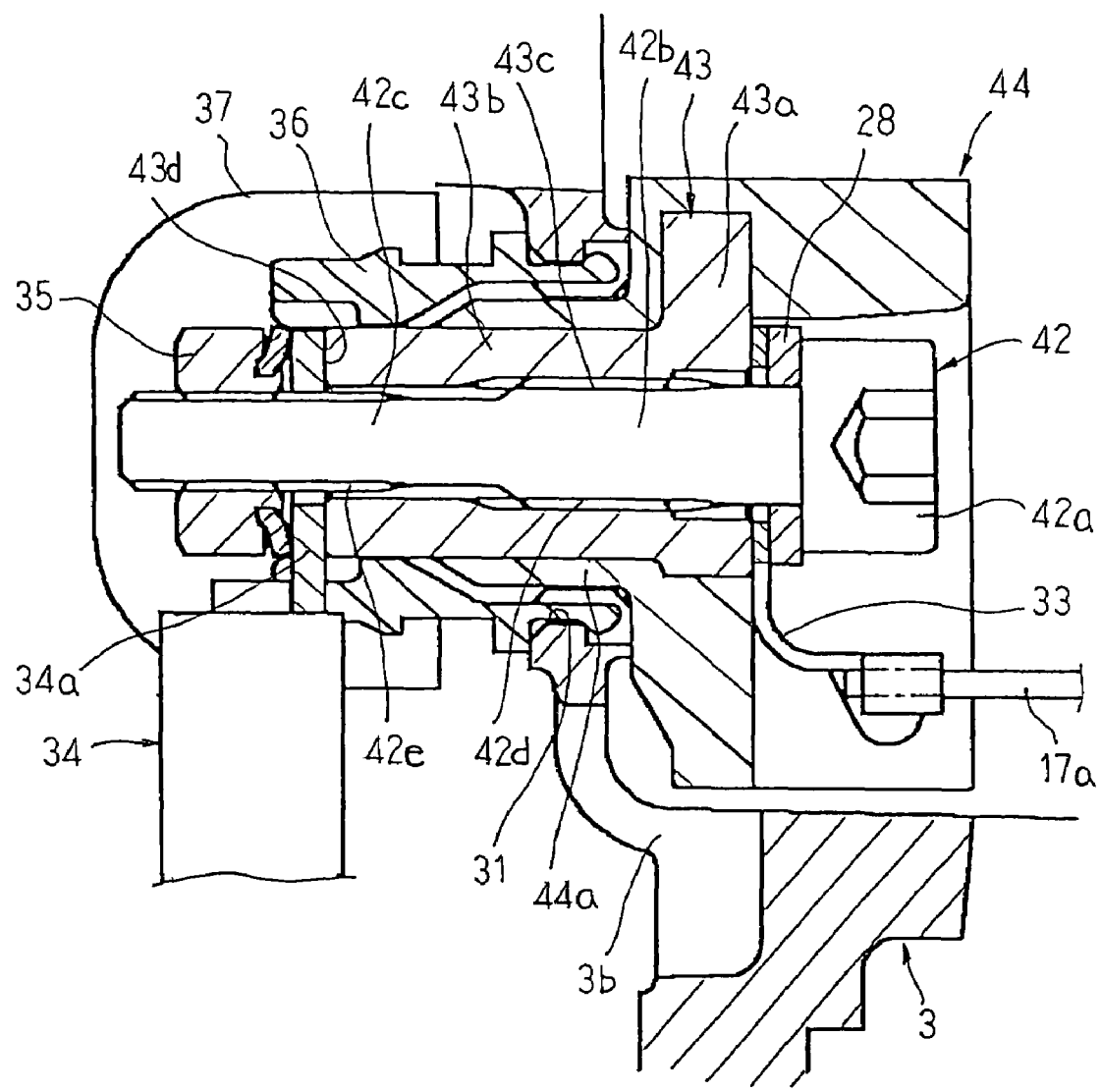
FIG. 8 is a partial enlarged cross section showing a vicinity of a three-phase output terminal portion in an automotive dynamoelectric machine according to Embodiment 3 of the present invention.

FIG. 8 is a partial enlarged cross section showing a vicinity of a three-phase output terminal portion in an automotive dynamoelectric machine according to Embodiment 2 of the present invention.

In FIG. 8, an output terminal bolt 42 is made of an electrically-conductive material such as iron, etc., and includes: a head portion 42a; a large-diameter first shaft portion 42b that is disposed so as to extend from the head portion 42a in one direction; a small-diameter second shaft portion 42c that is disposed so as to extend coaxially from the first shaft portion 42b; a first external screw thread portion 42d that is formed on the first shaft portion 42b; and a second external screw thread portion 42e that is formed on the second shaft portion 42c.

A relay member 43 is made of an electrically-conductive material such as iron, etc., and includes: a flat coupling seat portion 43a; a cylindrical portion 43b that is disposed so as to extend from the coupling seat portion 43a in one direction;

and an internal thread portion 43c that is formed inside the cylindrical portion 43b and screws together with the first external screw thread portion 42d. A first end surface of the cylindrical portion 43b constitutes an end surface 43d that is at an opposite end from the coupling seat.

Three relay members 43 are molded integrally into a fan guide 44 functioning as a molded body such that the coupling portions of the coupling seat portions 43a are exposed and the cylindrical portions 43b project outward. Insulating tubes 44a are formed integrally on the fan guide 44 so as to cover an outer side of each of the cylindrical portions 43b.

Moreover, the rest of this embodiment is configured in a similar manner to Embodiment 1 above.

In Embodiment 3, the fan guide 44 is mounted by fastening to the inner wall surfaces of the rear bracket 3 mounting screws (not shown) that pass through a portion of the coupling seat portions 43a in an electrically-insulated state. Then, the washers 28 and the stator terminals 33 are mounted to the first shaft portions 42b, and the first external screw thread portions 42d are fastened into the internal thread portions 43c of the cylindrical portions 43b. Thus, first ends of the stator terminals 33 are fastened to the coupling portions of the coupling seat portions 43a of the relay members 43 in a state of surface contact. The output wires 17a of the stator winding 17 are welded to second ends of the stator terminals 33.

The three-phase wire terminals 34a of the three-phase wires 34 are mounted to the second external screw thread portions 42e that are formed on the second shaft portions 42c of each of the output terminal bolts 42 that project outward through the extraction apertures 31, and are fastened in a state of surface contact to the end surfaces 43d of the relay members 41 that are at opposite ends from the coupling seats by fastening nuts 35 onto the second external screw thread portions 42e.

Here, the output terminal bolts 42, the relay members 43, and the nuts 35 constitute three-phase output terminal portions.

Consequently, similar effects to those in Embodiment 1 above can also be achieved in Embodiment 3.

According to Embodiment 3, because the coupling seat 26 and the relay member 27 from Embodiment 1 above are made into a relay member 43 that is constituted by a single member, the number of parts is reduced, improving assembly, and also improving the strength of the three-phase output terminal portions.

The first and second external screw thread portions 42d and 42e are also formed on the same output terminal bolts 42. In other words, the stator terminal 33 and the three-phase wire terminals 34a are fastened using single output terminal bolts 42. Thus, the construction of the three-phase output terminal portions is simplified and made robust.

What is claimed is:

1. An automotive dynamoelectric machine comprising:
a housing;
a rotor that is disposed inside said housing so as to be fixed to a rotor shaft that is rotatably supported by said housing;
cooling fans that are fixed to two axial end surfaces of said rotor;
a stator having:
a stator core that is disposed so as to surround said rotor; and
a stator winding that is installed in said stator core; and
three three-phase output terminal portions for extracting three-phase alternating-current output from said stator to three-phase wires,
wherein:
each of said three-phase output terminal portions comprises:
an output terminal bolt having:
a head portion;
a shaft portion that is disposed so as to extend from said head portion in one direction; and
a first external screw thread portion that is formed on said shaft portion;
a flat coupling seat that is disposed such that a stator terminal that is electrically connected to an output wire of said stator winding is held between said coupling seat and said head portion;
a relay member that is screwed onto said first external screw thread portion, that is projected outward through an extraction aperture that is disposed through said housing, and that presses said stator terminal between said head portion and said coupling seat;
a second external screw thread portion that projects outward from an end surface of said relay member at an opposite end from said coupling seat; and
a nut member that is screwed onto said second external screw thread portion such that a three-phase wire terminal that is electrically connected to said three-phase wires is fastened to said end surface of said relay member at said opposite end from said coupling seat; and
a protective member that is made of an insulating resin is interposed between said relay member and said extraction aperture so as to cover an outer side of said relay member.

2. An automotive dynamoelectric machine according to claim 1, wherein said second external screw thread portion is formed on said shaft portion of said output terminal bolt.

3. An automotive dynamoelectric machine according to claim 1, wherein said second external screw thread portion is formed on a shaft portion that is disposed so as to extend integrally from said end surface of said relay member at said opposite end from said coupling seat.

4. An automotive dynamoelectric machine according to claim 1, wherein said coupling seat and said relay member are formed as a single member.

5. An automotive dynamoelectric machine according to claim 1, wherein said three coupling seats are molded integrally into a molded body that is made of an insulating resin.

6. An automotive dynamoelectric machine according to claim 5, wherein said molded body is formed so as to have an annular shape and is disposed so as to be perpendicular to said rotor shaft so as to constitute a flat fan-facing surface.

7. An automotive dynamoelectric machine according to claim 5, wherein said protective member is molded integrally into said molded body.

8. An automotive dynamoelectric machine according to claim 5, wherein said molded body is fixed by fastening to said housing using mounting screws that pass through a portion of each of said coupling seats in an electrically-insulated state.

* * * * *